United States Patent
Roth et al.

(10) Patent No.: US 7,167,974 B2
(45) Date of Patent: Jan. 23, 2007

(54) MULTIPLE SAVED KERNEL CONFIGURATIONS

(75) Inventors: Steven Roth, Sunnyvale, CA (US); Aswin Chandramouleeswaran, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 464 days.

(21) Appl. No.: 10/440,100

(22) Filed: May 19, 2003

(65) Prior Publication Data

US 2004/0236931 A1    Nov. 25, 2004

(51) Int. Cl.
G06F 15/177    (2006.01)
(52) U.S. Cl. .............................................. 713/1; 713/2
(58) Field of Classification Search ................ 713/1, 713/2
See application file for complete search history.

(56) References Cited

U.S. PATENT DOCUMENTS

| | | | |
|---|---|---|---|
| 5,634,058 A | | 5/1997 | Allen et al. |
| 5,778,226 A | | 7/1998 | Adams et al. |
| 5,956,507 A | | 9/1999 | Shearer, Jr. et al. |
| 6,381,735 B1 | | 4/2002 | Hunt |
| 6,460,136 B1 | * | 10/2002 | Krohmer et al. ............... 713/2 |
| 6,591,376 B1 | * | 7/2003 | VanRooven et al. ........... 714/36 |
| 2002/0019823 A1 | * | 2/2002 | Layeghi ........................ 707/10 |
| 2002/0078338 A1 | * | 6/2002 | Lay et al. ...................... 713/2 |
| 2002/0194535 A1 | * | 12/2002 | Largman et al. ............... 714/13 |
| 2003/0195995 A1 | * | 10/2003 | Tabbara ....................... 709/313 |
| 2003/0225955 A1 | * | 12/2003 | Feldstein et al. ............ 710/306 |
| 2004/0083355 A1 | * | 4/2004 | Smith et al. .................... 713/1 |
| 2004/0221146 A1 | * | 11/2004 | Baumann ........................ 713/1 |

OTHER PUBLICATIONS

Wong, William. Ghost cloning gains GUI, PC Week, Jul. 6, 1998, vol. 15 Issue 27, p. 108.*
Symantec. Norton Ghost User's Guide, Appendix A. Aug. 26, 1998.*
Utimaco. Creating an Emergency Floppy Disk/System Kernel Backup. 1999.*
Jack Suess, Building a Kernel May 9, 2001.*
Brian Ward, The Linux Kernel HOWTO, CCL.NET, v2.1 Jan. 21, 2001.*
Werner Almesberger, Generic boot loader of Linux, Version 21 Dec. 4, 1998.*
Kernel (computer Science), Wikipedia.*
Compaq "System Administration" Tru64 UNIX Version 5.1A or higher, Jun. 2001.*
Leffler, Samuel J., et al., "Building Berkeley UNIX Kernels with Config.", Computer Systems Research Group, Department of Electrical Engineering and Computer Science, University of California, Berkeley, CA. Apr. 17, 1991.

* cited by examiner

*Primary Examiner*—Chun Cao
*Assistant Examiner*—Vincent Tran

(57) ABSTRACT

A method, and a corresponding mechanism, are used for generating and managing multiple saved kernel configurations. The method includes retrieving an existing kernel configuration, applying a kconfig command, by which a second kernel configuration is generated, and saving the second kernel configuration.

16 Claims, 5 Drawing Sheets

MULTIPLE SAVED KERNEL CONFIGURATIONS

TECHNICAL FIELD

The technical field is processes and mechanisms used in configuring UNIX® operating systems. More particularly, the technical field relates to processes and mechanism for configuring kernel modules.

BACKGROUND

One central component of a computer system operating in a UNIX® environment is an operating system kernel. In a typical UNIX® system, many applications, or processes may be running. All these processes use a memory-resident kernel to provide system services. The kernel manages the set of processes that are running on the system by ensuring that each such process is provided with some central processor unit (CPU) cycles when needed by the processes and by arranging for each such process to be resident in memory so that the process can run when required. The kernel provides a standard set of services that allows the processes to interact with the kernel and to simplify the task of the application writer. In the UNIX® environment, these services are sometimes referred to as "system calls," because the process calls a routine in the kernel (system) to undertake some specific task. Code in the kernel will then perform the task for the process, and will return a result to the process. In essence, the kernel fills in the gaps between what the process intends to happen, and how the system hardware needs to be controlled to achieve the process's objective.

The kernel's standard set of services is expressed as kernel modules (or simply, modules). The kernel typically includes modules such as drivers, including Streams drivers and device drivers, file system modules, scheduling classes, Streams modules, and system calls. These modules are compiled and subsequently linked together to form the kernel. Subsequently, when the system is started or "booted up", the kernel is loaded into memory.

Each module in the kernel has its own unique configuration. Some modules may include tunables, which govern the behavior of the kernel. Some tunables enable optional kernel behavior, and allow a system administrator to adapt a kernel to the administrator's own specific desires. In the discussion that follows, a module means any separately configurable unit of kernel code; a system file means a flat text file that contains administrator configuration choices in a compact, machine-readable format; and module metadata means data that describes a module's capabilities and characteristics.

SUMMARY

What is disclosed is a method for managing multiple saved kernel configurations. The method includes retrieving an existing kernel configuration, applying a kconfig command, by which a second kernel configuration is generated, and saving the second kernel configuration.

Also disclosed is a computer readable medium that includes routines that, when executed, perform the steps of retrieving an existing kernel configuration, applying a kconfig command, by which a second kernel configuration is generated, and saving the second kernel configuration.

Finally, what is disclosed is a mechanism for creating multiple saved kernel configurations. The mechanism includes a saved kernel configuration directory where multiple kernel configurations are maintained, and a kconfig module that receives a kernel configuration. The kconfig module includes kconfig commands capable of being applied to the kernel configuration to create at least a second kernel configuration.

DESCRIPTION OF THE DRAWINGS

The detailed description will refer to the following figures in which like numerals refer to like items, and in which.

DETAILED DESCRIPTION

Figure 1:
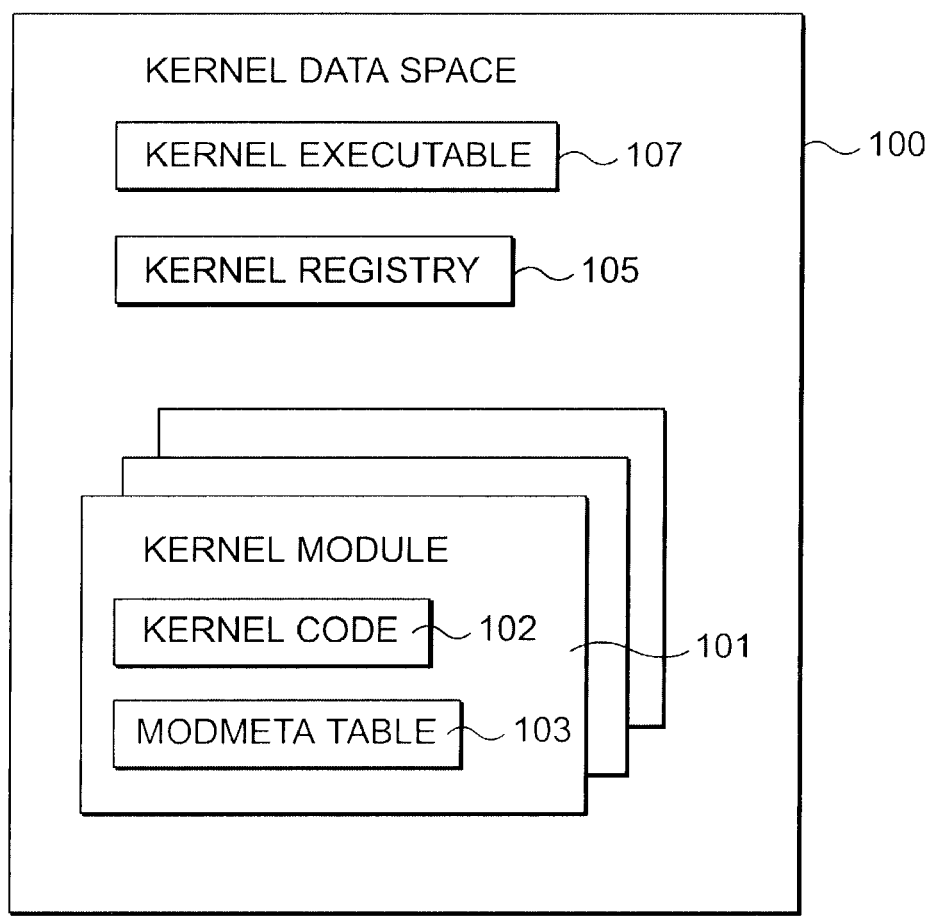
FIG. 1 illustrates an improved kernel configuration structure.

In typical UNIX® systems, a kernel is initially built with a basic set of modules. The basic set of modules should comprise at least those modules needed to provide the standard set of services to applications. However, additional modules may be built into the kernel according to a system administrator's requirements and specifications. For example, an administrator may prefer to load certain device driver modules based on the frequency of usage of those modules.

In a typical UNIX® system, the kernel is stored in a fixed location, and the related configuration data files are stored in other fixed locations. Because these locations are fixed, it is not possible, on prior art systems, to have more than one kernel and one set of configuration data files.

These features of current UNIX® systems impose some limitations on system flexibility. Furthermore, these systems have only a very rudimentary means for handling multiple kernel configuration settings. There was no concept of a kernel configuration as a whole. Instead, each individual setting was handled separately, and an administrator had to ensure manually that they matched. In addition, some configuration settings were tied to the kernel itself in a manner that prevented them from being stored elsewhere. Therefore, users of current systems cannot back up a kernel configuration completely. Finally, there was no reliable way to ensure that the same configuration was used on multiple machines, since each piece of the configuration had to be manually synchronized.

In at least one current UNIX® environment, the operating system kernel is a collection of just under 300 modules. Applying the restrictions of current systems to this large set of modules imposes significant burdens on system administrators.

In contrast to what is available with current UNIX® systems, an administrator, once satisfied with a kernel configuration, may desire to save a copy of the kernel configuration for a variety of reasons. First, the administrator may want to protect the system against inadvertent configuration changes. Second, the administrator may want to maintain multiple kernel configurations, and to be able to switch easily among the multiple kernel configurations. For example, the administrator may desire one kernel configuration for daytime multi-user processing, and another kernel configuration for nighttime batch processing. Third, the administrator may want to provide the same exact kernel configurations on multiple platforms.

Multiple saved kernel configurations can be created in at least three ways. In a first method, a currently running kernel configuration is saved. To save the currently running kernel configuration, the administrator uses kconfig -s. The resulting saved kernel configuration will include any changes to the currently running kernel configuration that are being held for next boot.

In a second method, the administrator copies an existing, saved kernel configuration using kconfig -c.

In a third method, the administrator uses system files to export and import the kernel configuration from one system (platform) to another system. This third method may be used in environments where every kernel configuration has a corresponding system file. A system file is a flat text file that describes all of the configuration settings in a compact, machine-readable, portable format.

System files provide an alternative mechanism for kernel configuration because configuration changes can be made by editing a system file and then using kernel configuration tools to apply the changes to the module. The changes may be made by using kconfig -e and kconfig -i commands.

The same procedure that is used for making configuration changes using system files may be used to copy a kernel configuration from one system (or platform) to another system. This method requires exporting the kernel configuration (using kconfig -e) from a first system, moving the kernel configuration to a second system, and importing the kernel configuration to the second system (using kconfig -i). The result of this method is that two system will run compatible versions of the same kernel configuration. If exact versions of the kernel configuration are desired to be run on two (or more) systems, the -V (Version match) flag can be applied while importing the kernel configuration on the second system. The -V flag turns on strict version checking, and the import will fail if the two systems have different versions of kernel modules installed.

In general, a first module is compatible with a second module if the first module has the same major version number as the second module, and an equal or higher minor version number. Each module has a version, which in an embodiment, is a series of integers separated by decimals. For example, a version may be stated as 2.0.1. The first integer is denoted as the major version number, and the second integer is the minor version number. The major version number is changed when a module is changed in a way that makes the module incompatible with other modules. The minor version number is changed when the module changes in a backward compatible fashion. The third integer is the revision number, and indicates changes in an externally invisible fashion. Strict version checking requires that all three version numbers match exactly.

Referring to FIG. 1, an embodiment of a kernel data space 100 is shown to include modules 101, a kernel registry 105, and a kernel executable 107. The kernel registry 105 is a hierarchical database that is persistent across reboots. The kernel executable 107 includes config routines and other kernel code needed to support the modules 101.

Each module 101 includes kernel code 102 and a modmeta table 103. The code 102 executes a specific function for which the module 101 is designed. The modmeta table 103 describes the characteristics and capabilities of the module 101. Metadata for a module 101 are used by kernel configuration tools when the module 101 is configured. The metadata are also used by various kernel services while the kennel module 101 is in use.

As is apparent from the above description, the metadata for a kernel is comprised of the metadata for each of the kernel's component modules. In the context of metadata definitions, a module is any block of kernel code that should be treated independently during kernel configuration. Each kernel module 101 has its associated metadata stored in its own unique modmeta file.

Figure 2:
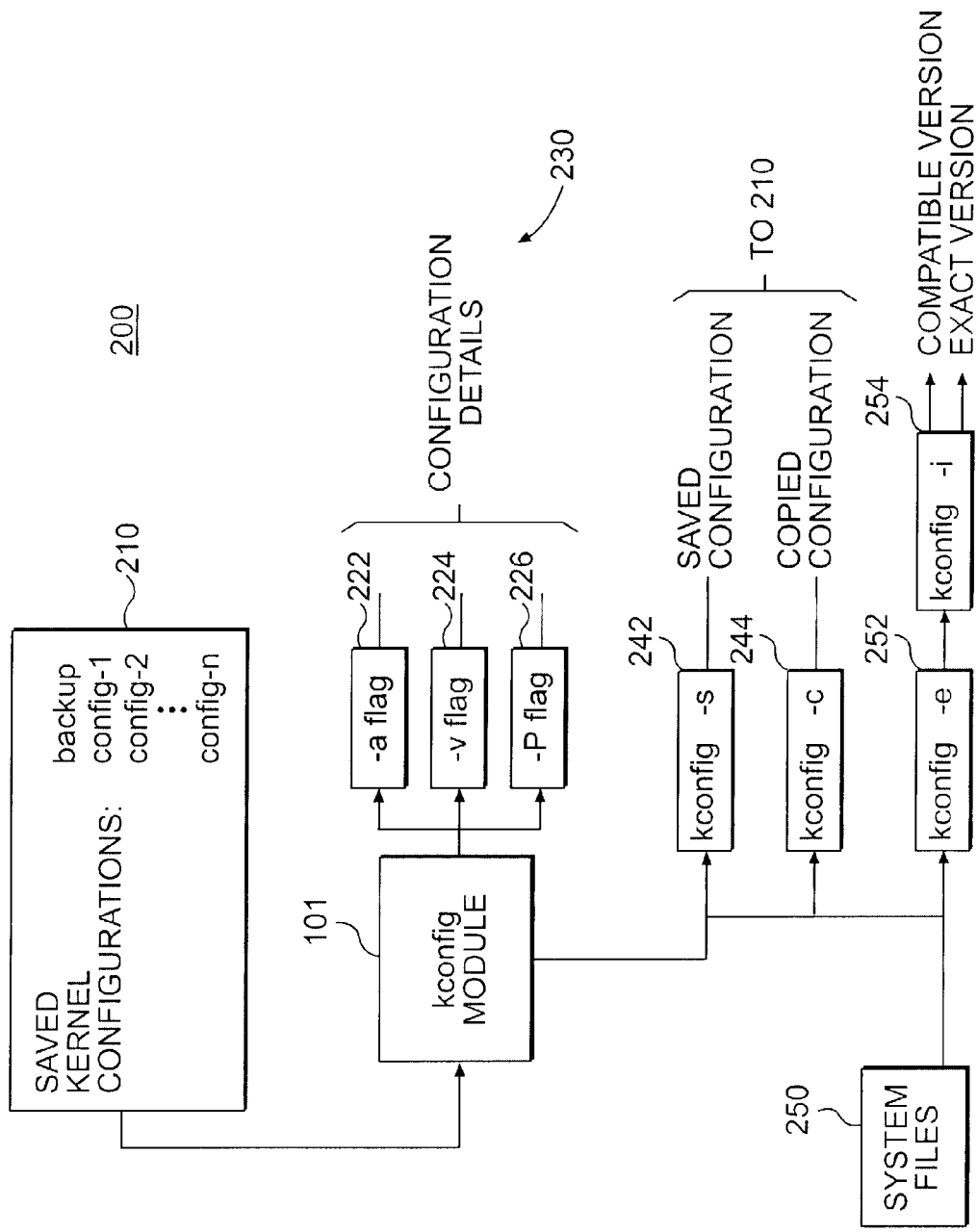
FIG. 2 is a diagram illustrating an embodiment of a mechanism for managing multiple saved kernel configurations.

In an alternative embodiment, the kernel configurations are described in corresponding system files. The system files may be stored outside the kernel data space 100. FIG. 2 illustrates an environment in which the kernel configurations are described by system files. In this environment, a mechanism 200 is used to make multiple copies of the kernel configuration according to one of at least three methods.

The mechanism 200 includes a directory of saved versions of the kernel configurations 210. The saved versions directory 210 will always include a backup. Other saved versions will also be stored in the saved versions directory 210. A kconfig module 101 accesses the saved version directory 210. Using one of an -a (all) flag 222, a -v (verbose) flag 224, and a -P (Parse) flag 226, the kconfig module 101 can be used to display 230 configuration details for any of the saved kernel configurations. The kconfig module 101 can also be used in conjunction with command kconfig -s 242 to generate a new saved version of the kernel configuration, and with command kconfig -c 244 to generate a copy of the kernel configuration. The new saved version and the copy may be stored in the saved version directory 210.

A third method for making multiple copies of the kernel configuration uses the kconfig -e (export) command 252 and the kconfig -i (import) command 254, in conjunction with system files 250 to export a kernel configuration from one system, move the kernel configuration to a second system, and import the kernel configuration to the second system. The imported kernel configuration can be compatible with the exported kernel configuration, or, by applying the -V flag (not shown), and exact match between the kernel configurations can be enforced. This third method is particularly useful when a system administrator desires to use an exact, or at least a compatible version of the kernel configuration on multiple systems.

Figure 3:
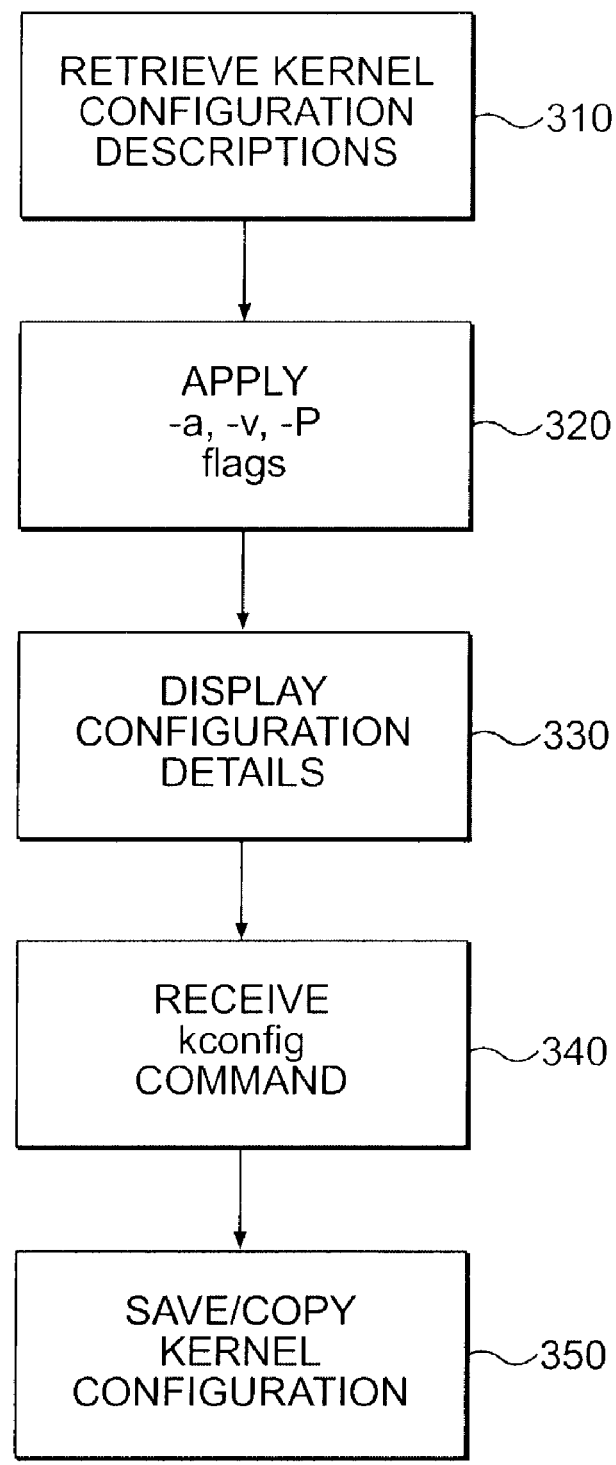
FIGS. 3 and 4 are flowcharts illustrating routines for managing multiple saved kernel configurations.

FIG. 3 is a flowchart illustrating a routine 300 for making and managing multiple copies of kernel configurations using the mechanism 200 illustrated in FIG. 2. In FIG. 3, the routine 300 begins (block 310) with retrieving the kernel configuration descriptions from the saved versions directory 210. In block 320, the kconfig module applies one of three user-designated flags to the retrieved descriptions. In block 330, the descriptions are displayed to the user. In block 340, the mechanism 200 receives one of two kconfig commands, and either saves or copies the designated kernel configuration into the saved versions directory 210, block 350. The routine 300 then ends.

Figure 4:
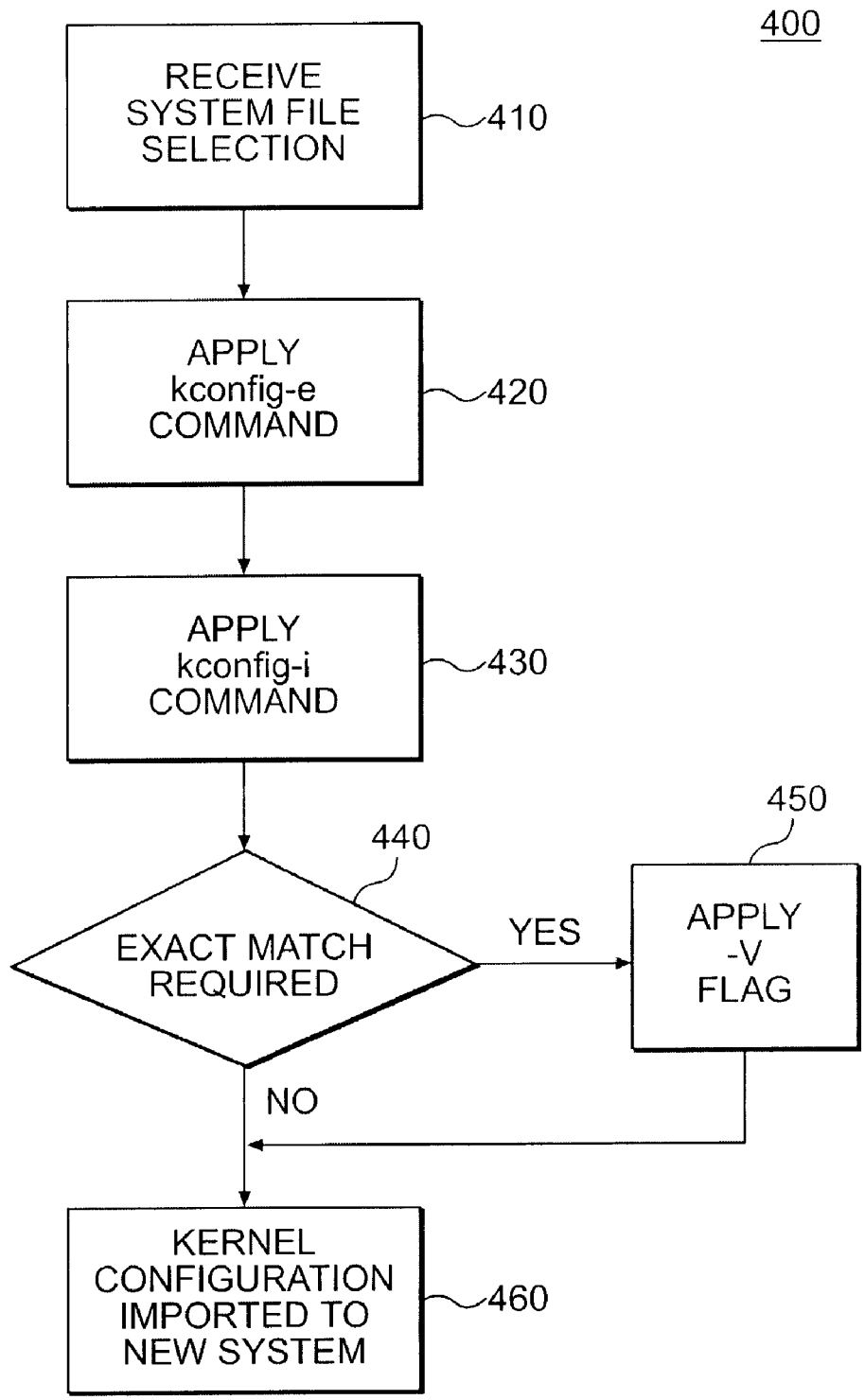

FIG. 4 is a flowchart illustrating a routine 400 or making a version of a kernel configuration available on multiple systems. In FIG. 4, the routine 400 begins when a system file is selected and received, block 410. In block 420, the kconfig -e command is applied to export the kernel configuration. In block 430, the exported kernel configuration is moved to a second system, and the kconfig -i command is applied. In block 440, a query may be generated asking the user to select a compatible version or an exact version of the kernel configuration. If a compatible version is selected, the routine 400 moves to block 460 and the kernel configuration is imported to the second system. In block 440, if an exact version is required, the -V flag is applied (block 450), invoking strict version matching. Assuming an exact match is possible, the routine moves to block 460 and the exact version of the kernel configuration is imported to the second system. If an exact match is not possible, the attempt to copy the kernel configuration to the second system fails.

Figure 5:
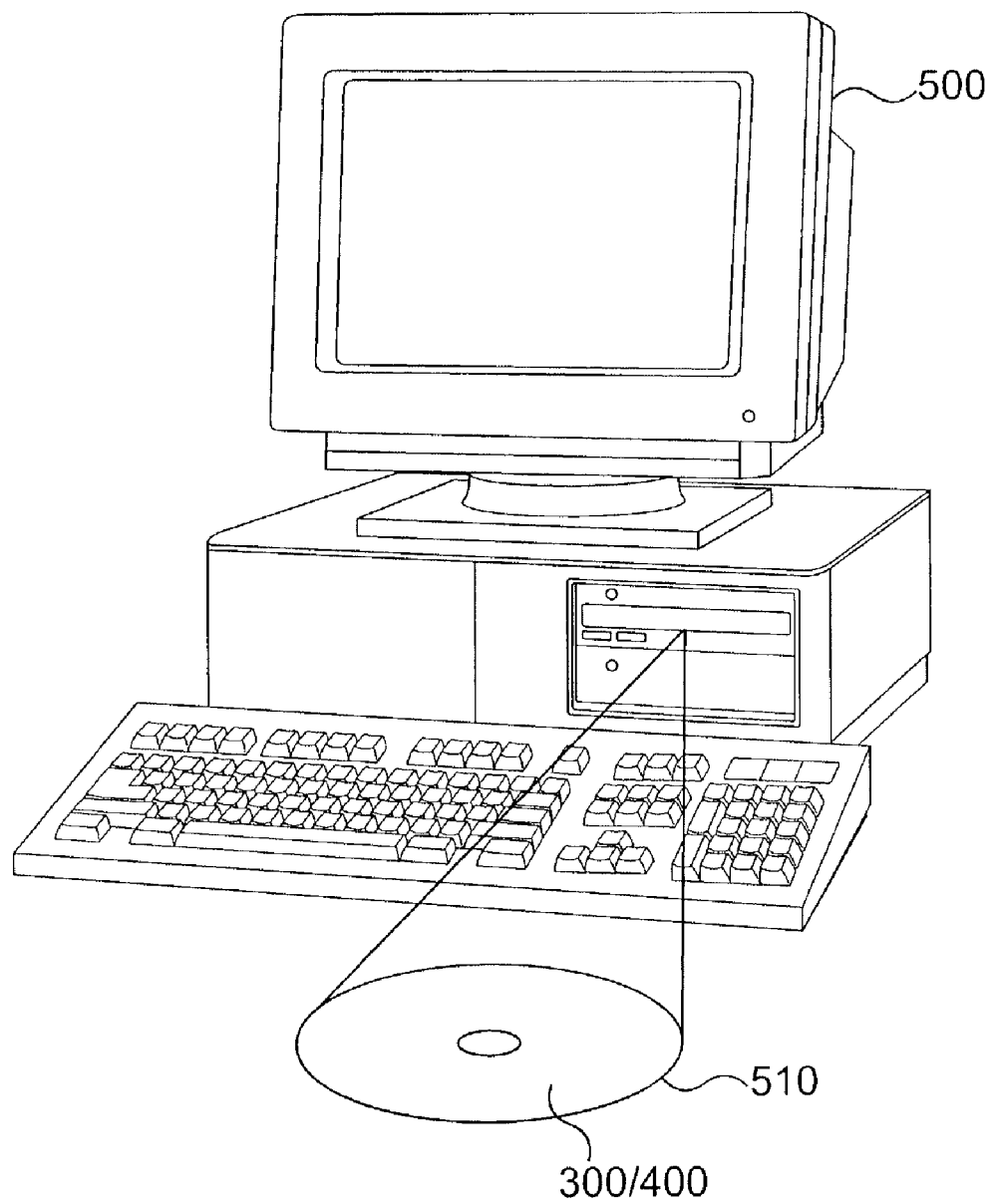
FIG. 5 illustrates a computer-readable medium that incorporates routines used to manage multiple saved kernel configurations.

FIG. 5 shows a computer system 300 running a UNIX® operating system, that is capable of multiple kernel configuration management. A computer readable medium 310 is provided with appropriate programming, including programming to execute the routines 300 and 400 described above. The computer readable medium 310 may be any know medium, including optical discs, magnetic discs, hard discs, and other storage devices known to those of skill in the art. Alternatively, the programming required to implement the routines 300 and 400 may be provided using a carrier wave over a communications network such as the Internet, for example.

We claim:

1. A method for managing multiple saved kernel configurations, comprising:
   retrieving an existing kernel configuration;
   applying a kconfig command, wherein a second kernel configuration is generated, wherein the kconfig command comprises a kconfig -e command and a kconfig -i command, and wherein application of the kconfig command exports the retrieved kernel configuration from a first system and imports the retrieved kernel configuration to a second system; and
   saving the second kernel configuration.

2. The method of claim 1, wherein a kernel configuration includes all data needed to describe the configuration of the kernel.

3. The method of claim 1, further comprising applying one of an all flag, a verbose flag, and a Parse flag to the retrieved kernel configuration.

4. The method of claim 1, further comprising displaying details of the retrieved kernel configuration.

5. The method of claim 1, wherein the second kernel configuration is saved with the existing kernel configuration.

6. The method of claim 1, wherein the retrieved kernel configuration is described by a system file.

7. The method of claim 1, further comprising designating an exact version of the kernel configuration to be imported, the designating step comprising applying a V flag.

8. A computer readable medium comprising routines to manage multiple saved kernel configurations, the routines, when executed, comprising the steps of:
   retrieving an existing kernel configuration;
   applying a kconfig command, wherein a second kernel configuration is generated, wherein the kconfig command comprises a kconfig -e command and a kconfig -i command, and wherein application of the kconfig command exports the retrieved kernel configuration from a first system and imports the retrieved kernel configuration to a second system; and
   saving the second kernel configuration.

9. The computer-readable medium of claim 8, wherein the steps further comprise applying one of an all flag, a verbose flag, and a Parse flag to the retrieved kernel configuration.

10. The computer-readable medium of claim 8, wherein the steps further comprise displaying details of the retrieved kernel configuration.

11. The computer-readable medium of claim 8, wherein the second version of the kernel configuration is saved with the existing kernel configuration.

12. The computer-readable medium of claim 8, wherein the retrieved kernel configuration is described in a system file.

13. The computer-readable medium of claim 8, wherein the steps further comprise designating an exact version of the kernel configuration to be imported, the designating step comprising applying a -V flag.

14. The computer-readable medium of claim 8, wherein a kernel configuration includes all data needed to describe the configuration of the kernel.

15. A mechanism for managing multiple saved kernel configurations, comprising:
   a saved kernel configuration directory, wherein multiple kernel configurations are maintained; and
   a kconfig module that receives a kernel configuration, the kconfig module comprising kconfig commands capable of being applied to the kernel configuration, wherein at least a second kernel configuration is generated, wherein the kconfig command comprises a kconfig -e command and a kconfig -i command, and wherein application of the kconfig command exports the retrieved kernel configuration from a first system and imports the retrieved kernel configuration to a second system.

16. The mechanism of claim 15, further comprising a strict version command, wherein the imported kernel configuration is an exact copy of the exported kernel configuration.

* * * * *

UNITED STATES PATENT AND TRADEMARK OFFICE
CERTIFICATE OF CORRECTION

| | | |
|---|---|---|
| PATENT NO. | : 7,167,974 B2 | Page 1 of 1 |
| APPLICATION NO. | : 10/440100 | |
| DATED | : January 23, 2007 | |
| INVENTOR(S) | : Steven Roth et al. | |

It is certified that error appears in the above-identified patent and that said Letters Patent is hereby corrected as shown below:

In column 3, line 67, delete "kennel" and insert -- kernel --, therefor.

Signed and Sealed this

Fourth Day of August, 2009

JOHN DOLL
*Acting Director of the United States Patent and Trademark Office*